United States Patent [19]
Van Der Haar et al.

[11] Patent Number: 6,157,367
[45] Date of Patent: Dec. 5, 2000

[54] USER INTERFACE WITH COMPOUND CURSOR

[75] Inventors: Robert A. Van Der Haar, Le Mans, France; Timothy J. Everett, Thakeham, United Kingdom

[73] Assignee: U.S. Philips Corporation, New York, N.Y.

[21] Appl. No.: 09/044,547

[22] Filed: Mar. 19, 1998

[30] Foreign Application Priority Data

Apr. 2, 1997 [GB] United Kingdom ............... 9706711

[51] Int. Cl.⁷ ..................................... G09G 5/08
[52] U.S. Cl. ........................... 345/145; 345/334
[58] Field of Search .................. 345/326, 145, 345/352, 334, 146, 157

[56] References Cited

U.S. PATENT DOCUMENTS

| | | | |
|---|---|---|---|
| 4,984,152 | 1/1991 | Muller | 345/333 |
| 5,528,735 | 6/1996 | Strasnick et al. | 395/327 |
| 5,586,243 | 12/1996 | Barber et al. | 345/326 |
| 5,621,434 | 4/1997 | Marsh | 345/145 |

FOREIGN PATENT DOCUMENTS

| | | | |
|---|---|---|---|
| 2166627 | 5/1986 | United Kingdom | G06F 3/037 |
| WO94/20921 | 9/1994 | WIPO | G06F 15/62 |

OTHER PUBLICATIONS

"Principles of Interactive Computer Graphics", Second Edition, William M. Newman, Zerox Corporation, Robert F. Sproull, Carnegie–Mellon University, McGraw–Hill International Book Company, pp. 159–176.

*Primary Examiner*—Steven J. Saras
*Assistant Examiner*—Uchendu O. Anyaso
*Attorney, Agent, or Firm*—Gregory L. Thorne

[57] ABSTRACT

A compound cursor arrangement for use in a graphic user interface of a computer system is described. The compound cursor comprises an active part (38) which acts in conventional manner and is manoeuvred directly by user commands from an input device (22) such as a mouse or trackball. Accompanying the active portion (38) is a passive cursor (40) which follows the active cursor around the display when the separation between the two cursor parts exceed a theshold value (42). The function of the passive cursor (40) is to drag icons (34) selected by the active cursor (38) and deposited on the passive cursor, the active cursor the being freed for other tasks.

10 Claims, 8 Drawing Sheets

USER INTERFACE WITH COMPOUND CURSOR

The present invention relates generally to the field of visual computer interfaces in two or three dimensions, and in particular to the generation and user-directed control of a cursor by means of which displayed icons may be manipulated.

Graphic user interfaces (GUIs) have become very popular, being recognised as an efficient way of presenting a large amount of data to computer users: various generations of the Macintosh GUI produced by the Apple Computer Company and the Windows interface GUI produced by Microsoft Corporation are well known examples of two-dimensional arrangements. Such GUIs typically use a variety of symbols, menus or icons to represent system facilities or data structures, the selection or activation of which is achieved by means of a pointer device (such as a mouse or trackball) moving a computer-generated cursor to a position overlying an icon with a selection command then being input by pressing one from the two or three buttons to be found on such devices. Further two dimensional background examples are described in, for example, International Patent Application WO94/20921 to Asymmetrics Corporation, and three dimensional examples in U.S. Pat. No. 5,528,735 to Silicon Graphics, Inc.

A particular feature of interest is the facility for moving icons from one area of the interface to another, for example to assign various system functions to a "start up" facility such that they will be automatically activated when the computer is powered up. One means for moving icons involves the initial selection of a "move" option from a menu associated with the icon, which menu is called up by actuating or selecting (for example by operating a particular button on a mouse) when the cursor is over the icon. Following selection of the "move" option, the icon moves with (or in some cases replaces) the displayed cursor following the movement commands input via the mouse or other pointer device, until de-selected (often simply a case of again operating the mouse button). An alternative arrangement allows icons to be moved by simply operating and holding a mouse button with the cursor positioned over an icon and then dragging the icon to a new location: the icon is released when the mouse button is released. In yet a further alternative arrangement, the mouse or other pointer device may have a dedicated "move button" which need not be held down following initial operation but instead requires a second operation to release the icon.

It is recognised that, as computer systems develop, the GUIs presented will become more complex in order to represent the additional features available to the user, and there is a desire to enhance the functionality of the pointing device/display cursor arrangement, in particular with regard to the number or extent of pointer device manipulations which the user is required to undertake. In the above-mentioned WO94/20921, the enhancement takes the form of a pop-up menu which appears on screen at the cursor's current location when a second button on the pointer device is pressed. Whilst such a feature provides one answer to the problem of reducing the amount of physical manipulation of the pointer device required of the user, it does not address that part of the problem arising simply due to the sheer numbers of icons presented and requiring manipulation.

It is accordingly an object of the present invention to provide a means for generating a user interface providing enhanced functionality to the user through improvements to the form and function of an icon manipulating cursor generated as part of the interface such as to reduce the workload to the user over a period of icon handling operations.

In accordance with the present invention there is provided an apparatus arranged to generate a graphic user interface (GUI) for presentation via a display device to a user, said apparatus supporting user-directed cursor manipulation of icons presented in the GUI and comprising:

data processing means coupled with one or more storage devices and configured to generate a GUI, representative of apparatus operations and comprising a plurality of icons, for output to a display device;

an input for user position signals coupled with said data processing means, said data processing means being arranged to generate a first cursor, an active cursor, within the GUI at a location determined by said user position signals; and an input for a user selection signal coupled with said data processing means, the active cursor acting to drag an overlaid icon, as directed by the user position signals, following receipt of a user selection signal;

characterised in that the data processing means is further arranged to generate a second cursor, a passive cursor, within the GUI, movement of the passive cursor being determined at least partly by that of the active cursor when the separation of the active and passive cursors exceeds a threshold value, and the passive cursor being arranged to drag an icon placed thereon by the active cursor.

By providing the passive cursor to follow the active one and drag icons selected by it, the active cursor is freed to carry out other tasks or pick up a second icon without having first to de-select or deliver the first-selected icon. This arrangement enhances the functionality whilst providing a means whereby the number or extent of pointer device manipulations required to be undertaken by the user may be reduced. In circumstances where moving large numbers of icons is a relatively frequent requirement, the system may be further enhanced by the provision of two or more passive cursors following the active cursor, although a limit on the number of passive cursors will be found by the need to avoid the "compound cursor" becoming too unwieldy for fast and accurate interfacing.

In use, the active and/or passive cursors may be displayed with a screen orientation within the two- or three-dimensioned environment of the interface and determined by the relative locations of the active and passive cursors. Such a feature would have benefit in GUIs displaying relatively crowded arrangements of icons in that the display orientation of, for example, the active cursor would provide a quick visual cue to the location of the passive cursor. In a further extension of the functionality, the extent of movement of the active cursor in the GUI in relation to a given increment in user position signal may be determined by the relative separation of the active and passive cursors. This compound cursor might start to slowly move in a direction along a line linking the passive to the active cursor when the separation between them exceeds the threshold, with the user then only having to input a small movement in the current direction of travel to increase the speed or in the opposite direction (back to within the threshold) to stop the motion of the compound cursor.

In operation, the data processing means may be arranged to select one of two or more display forms of the active cursor in dependence on whether or not an icon has been selected. This feature would provide an aid to the user when navigating a relatively crowded GUI where momentary confusion might otherwise arise as the active cursor passes over icons.

In a further embodiment, the apparatus may be configured for multiple users with respective user position signal and selection signal inputs being coupled to the data processing means which would be arranged to generate a separate active cursor, with respective passive cursor, for each user. This would allow a number of users to operate a common application, perhaps from separate work stations linked by a data network to a central apparatus sending out the GUI, perhaps in the form of a three-dimensional virtual work environment, to each work station. In order to avoid confusion, such a distributed apparatus would preferably further comprise means for enabling each user to select a respective one from a plurality of stored active and associated passive cursor display forms, such as to allow each user to readily and rapidly identify their particular cursor from others appearing on the display.

Further features and advantages of the present invention will become apparent from reading of the following description of preferred embodiments of the invention, given by way of example only, and with reference to the accompanying drawings, in which:

Figure 1:
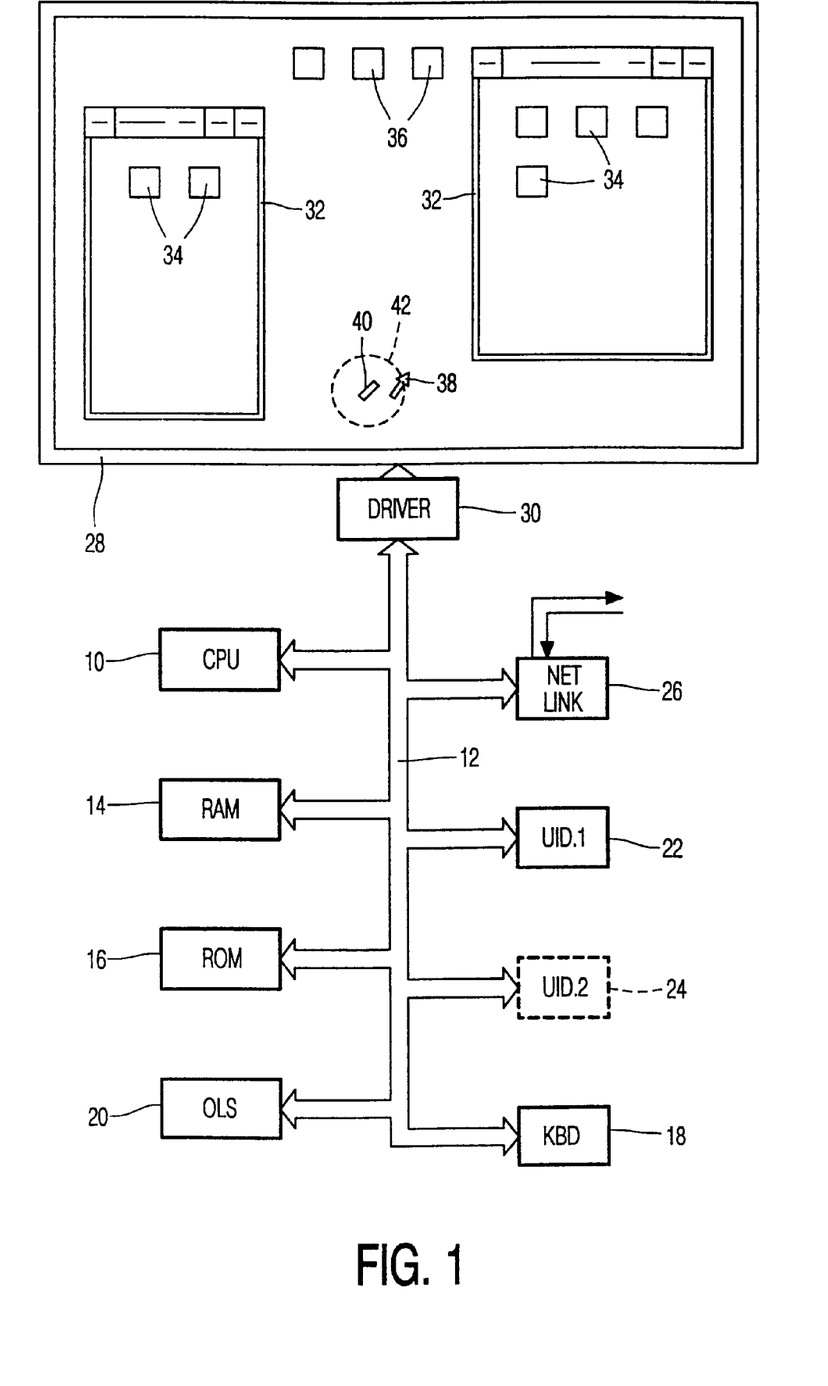
FIG. 1 schematically represents a computer system with displayed interface including a compound cursor embodying the invention.

Referring to FIG. 1, a computer controlled display system is generally illustrated, comprising a processor CPU 10 linked via address and data bus 12 to random-access and read-only memories 14, 16. Also coupled to the CPU via the bus 12 are a keyboard 18, off-line storage means 20 (for example a CD-ROM in an appropriate reader), a first user input device UID 22, optionally one or more further UID's 24, optionally an interfacing link 26 to a data and/or communications network, and a display screen 28 coupled via display driver stage 30. The GUI in this and the following examples is two-dimensional for ease of illustration, although the skilled reader will readily appreciate how the techniques described may be extended to three-dimensional interfaces.

On display 28, the CPU 10 generates the GUI based on format data from ROM 16 and with regard to current apparatus status data in RAM 14. As shown, the GUI may include one or more window screens 32 each containing one or more icons 34 representing, for example, system facilities that can be called up by selection of the particular icon. Further icons 36, each representing a respective window screen, may be further presented.

Also appearing on the display is an active cursor 38 which responds directly to movement commands input by the user via UID 22 and which is operable to select or activate icons by use of one or more selection buttons provided on the UID. Trailing the active cursor 38 is a passive cursor 40 which follows when the active cursor exceeds a threshold distance from the passive cursor (illustrated by dashed ring 42) but remains stationary whilst the active cursor is within this ring. The sole purpose of this passive cursor 40 is to carry icons picked up by the active cursor 38 and placed on it. In terms of the example shown, an operation requiring the movement of both icons 34 from the left hand window screen to the right hand screen could be accomplished in a single traverse of the screen if one of the icons were first deposited on the passive cursor 40 with the second then being picked up by the active cursor 38.

Figure 2:
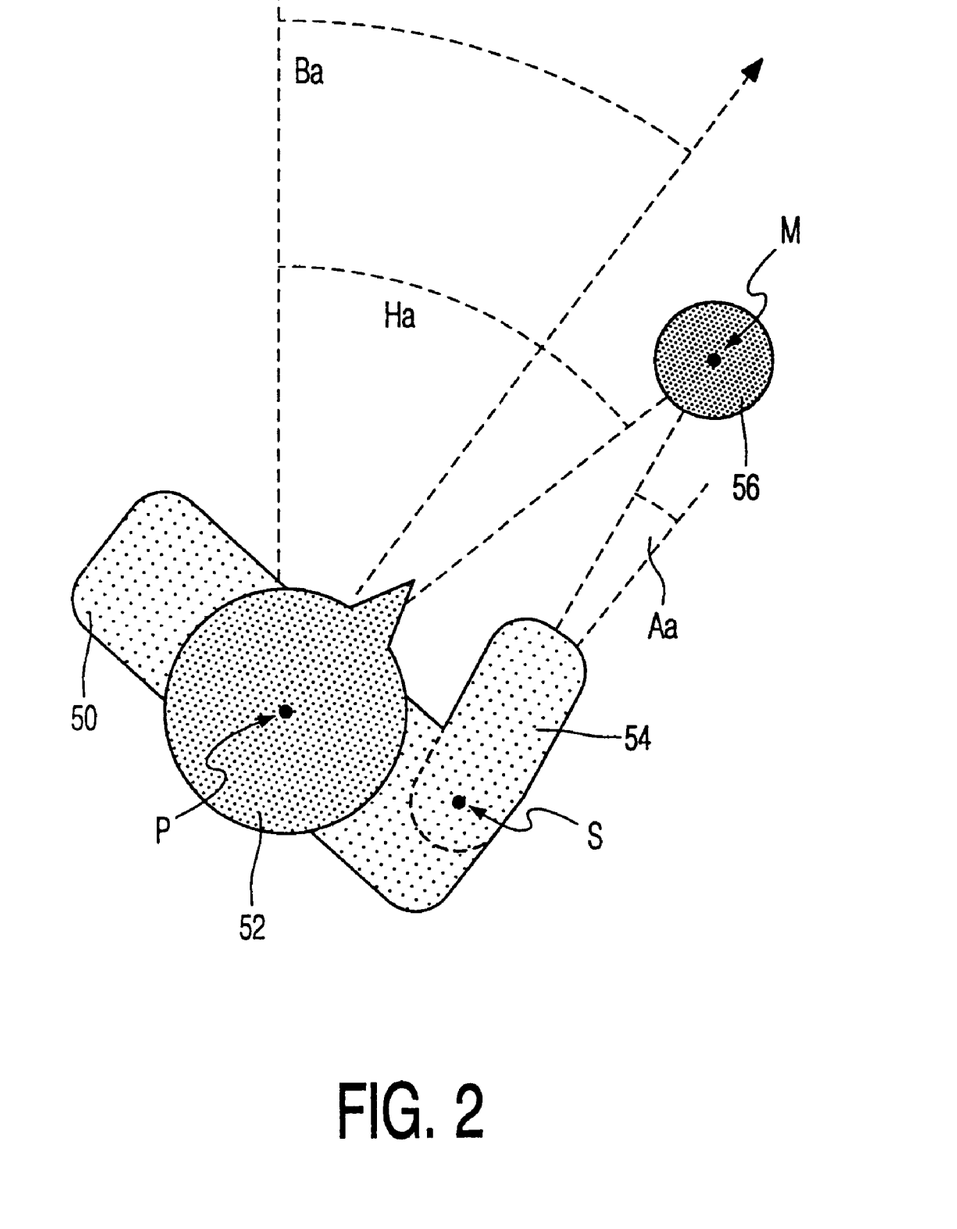
FIG. 2 represents angular positional relationship between components of a compound cursor.

Whilst the compound arrangement of active and passive cursor may be made of two simple and distinct display forms as in FIG. 1, the compound arrangement lends itself particularly to various design options which enhance the user friendliness and operability. A particular range of preferred options for the compound cursor, referred to generically herein as an anthropomorphic cursor, will now be described whilst further illustrating general operating features of the compound cursor. The essence of the anthropomorphic cursor is to combine representation, manipulation, navigation and communication functionalities (to be described) in an intuitive way. As shown in FIG. 2, the anthropomorphic cursor is a more complex construction consisting of a body 50 to show the direction of movement, a head 52 with a nose to show the direction of gaze and hearing, an arm 54 and a hand portion 56 to touch, grab hold and point. In terms of the compound arrangement, the body 50 corresponds to the passive cursor (40; FIG. 1) which transports icons deposited on it. As will be described, rather than the whole body 50, a distinct portion of it may be designated the passive cursor with the remainder being unreactive to deposited icons. There is a direct interaction between the movement of the user's mouse or other input device and the movement of the cursor's hand portion 56 (corresponding to the active cursor): by finding the proper limitations for the arm 54, head 52 and body 50 rotation to follow the hand portion 56, an intuitive control results which looks very natural.

Figure 3:
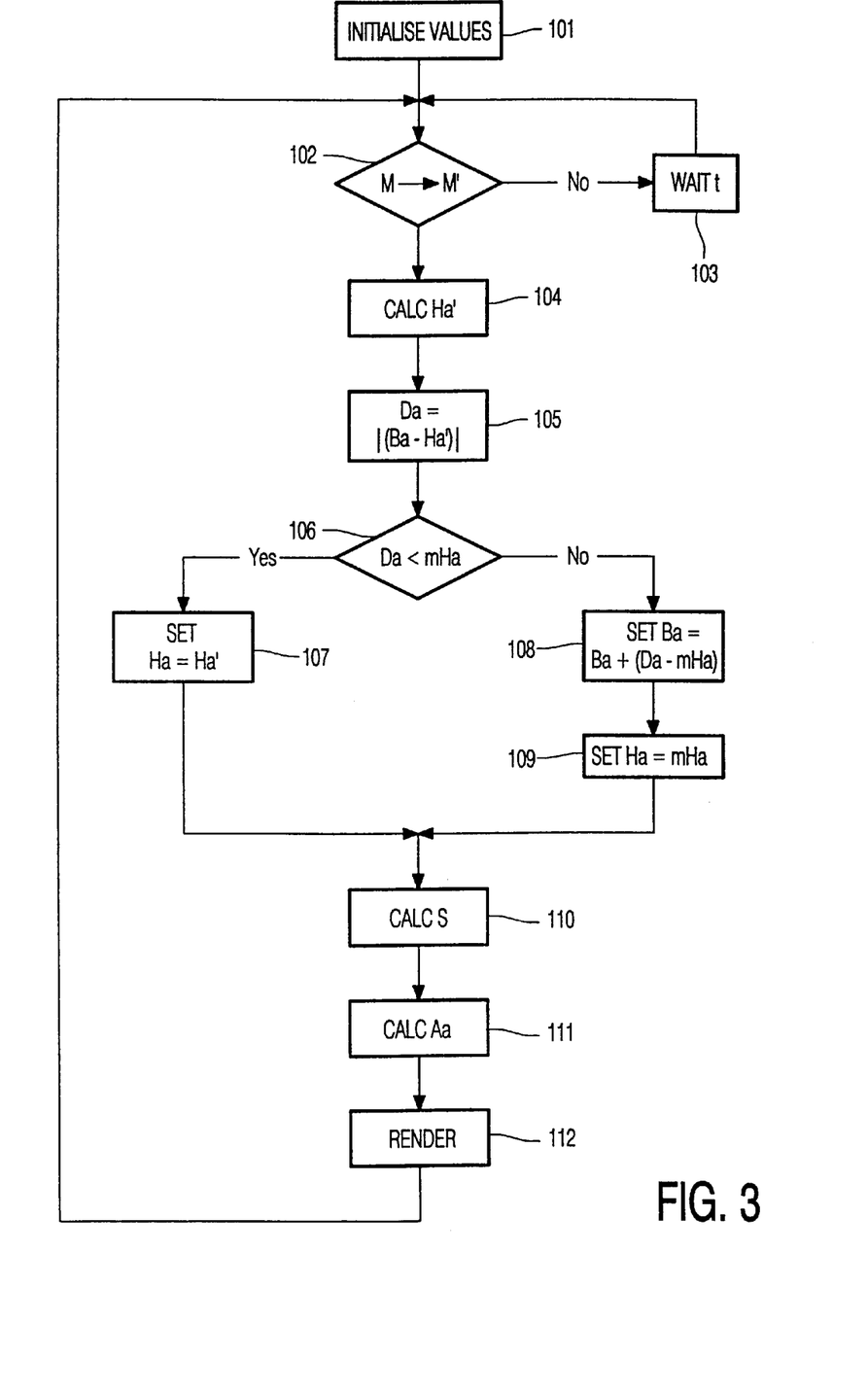
FIG. 3 is a flow chart describing derivation of relative movement between components of the cursor of FIG. 2.
Figure 4A:
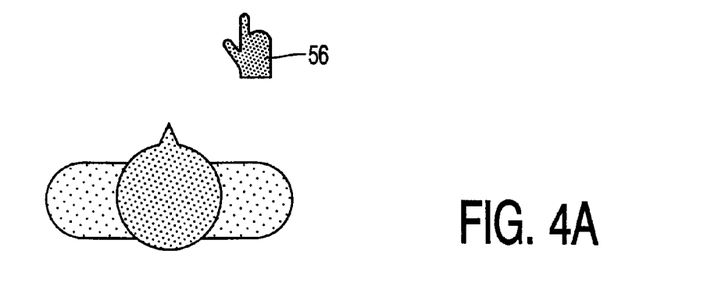
FIG. 4 illustrates relative movement between components during rotation of a cursor similar to that of FIG. 2.
Figure 4B:
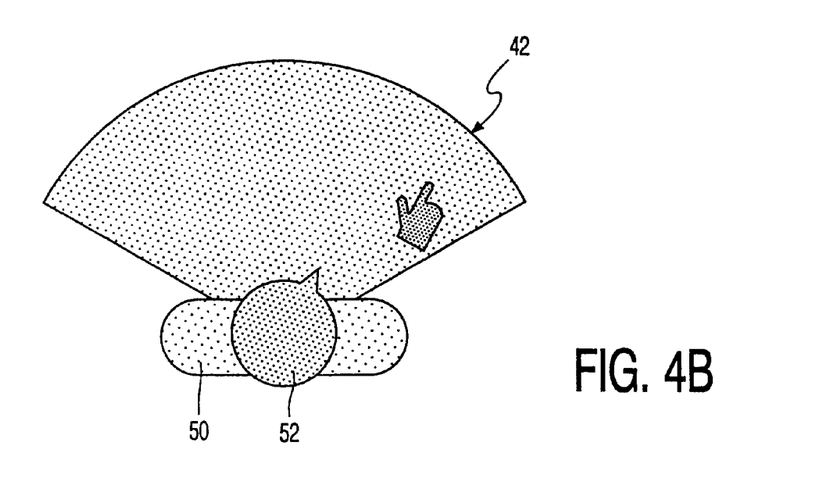
Figure 4C:
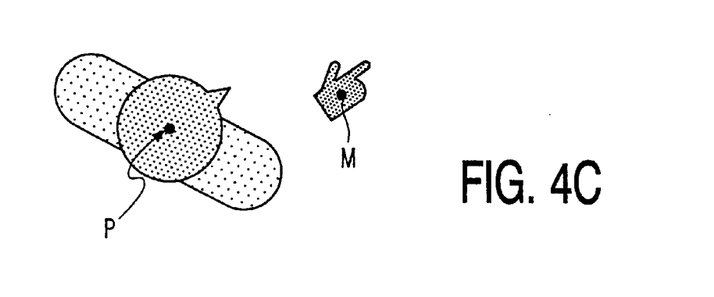
Figure 4D:
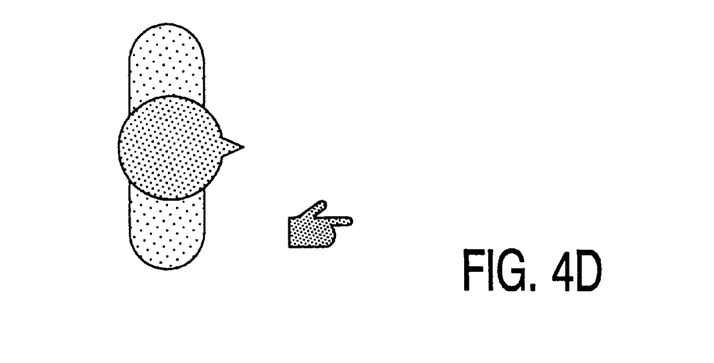

Referring still to FIG. 2 and also to the flow chart of FIG. 3, the process of determining the relative locations of the component parts of the anthropomorphic cursor in response to movements of the cursor's hand portion 56 (active cursor) will now be described. In the nomenclature of FIG. 2, the body 50 is located at a point P and is rotated about P by Ba degrees. The head 52 is also located at P and is rotated about P by Ha degrees. The arm 54 is attached to (and rotatable about) a point S on the body 50 with a rotation about S of Aa degrees: the distance from S to P is a constant. The hand portion 56 is located at point M: for the purposes of this initial example, it is assumed that the distance M to P remains below the threshold (equivalent to remaining within the ring 42 in FIG. 1).

In the initial procedural step 101 (FIG. 3) initial values for P, M and Ba are loaded, and Ha and Aa are calculated such that the head 52 and arm 54 respectively point towards position M.

The next step 102 is to determine whether cursor motion commands have been received (from UID 22) such that the location of the hand portion 56 is to be moved to a new cursor position M'. If the hand portion 56 has not moved, the system waits a short time t (step 103) before again checking for input cursor movement commands.

Having determined at step 102 that the cursor location has moved to new position M', the new angle for the head 52 Ha' is calculated (at step 104) such that the head turns towards the new position M' of the hand portion 56. There is a maximum specified extent for the head rotation (angle mHa)

beyond which it is necessary to rotate the body 50 about point P to enable the head 52 to look directly at the hand portion 56. Consequently, having determined Ha' at step 104, the next step (105) determines a difference Da between the body angle Ba and Ha', and at step 106 a check is made as to whether this difference Da is less than the maximum head angle mHa. If so, the new head angle is simply set to the calculated value Ha' at step 107. However, if step 106 shows that the difference exceeds the maximum head angle mHa, then the body angle Ba is modified at step 108 to be the sum of the previous body angle and the extent by which Ha' exceeds mHa. Having determined this body rotation, the next step at 109 sets the head angle to the maximum possible, that is to say mHa.

Having determined the new orientations for the head 52 and, where necessary, the body 50, the new location of the shoulder point S is determined (from its rotation by angle Ba about point P) in step 110. Having determined the new location of S, the final calculation, at step 111, is to determine the angle Aa for the arm 54 such that it points towards the hand portion 56. Note that, although shown in FIG. 2 as a circular body, the hand portion 56 may well be non-symmetrical, as will be shown in succeeding examples, in which case the calculated angle Aa is further used to determine a display orientation for the hand portion 56.

The final stage of the process, at step 112, is to render the cursor with its new orientation before returning to step 102 to see if there has been any further user positional command input.

The effect of the specification of the maximum head angle mHa and the consequent rotation of the body 50 when this is exceeded is illustrated through steps A to D in FIG. 4. Note that in this particular design, there is slight offset applied between the direction in which the nose portion of the head 52 is pointing and the line from point P to point M, the centre of the head 52 to the active cursor point of the hand portion 56. This offset is to give the anthropomorphic cursor the more natural appearance of looking straight forward when the hand portion 56 is at a rest location to the right hand side of the body 50, as shown at A in FIG. 4. The limit of mHa leads to left and right radial limits within the field bounded by circle 42 (centred on P) as shown at B. As shown at C, once the hand portion 56 leaves this bounded field, the rotation of the body 50 commences: at D the body 50 has been turned through 90° and the hand portion 56 is again within the bounded field at the rest position, such that the head portion 52 appears to be looking straight ahead.

The anthropomorphic cursor as shown in FIG. 4 differs from that of FIG. 2 in that no arm portion 54 is drawn although angle Aa will still be calculated to determine the orientation of the non-symmetrical hand portion 56. A further design for the anthropomorphic cursor is shown in FIGS. 5, 6 and 7 which respectively represent the active cursor portion of the anthropomorphic cursor identifying an icon 60, grasping (selecting) it, and transferring it to the passive cursor portion for carriage.

Figure 5:
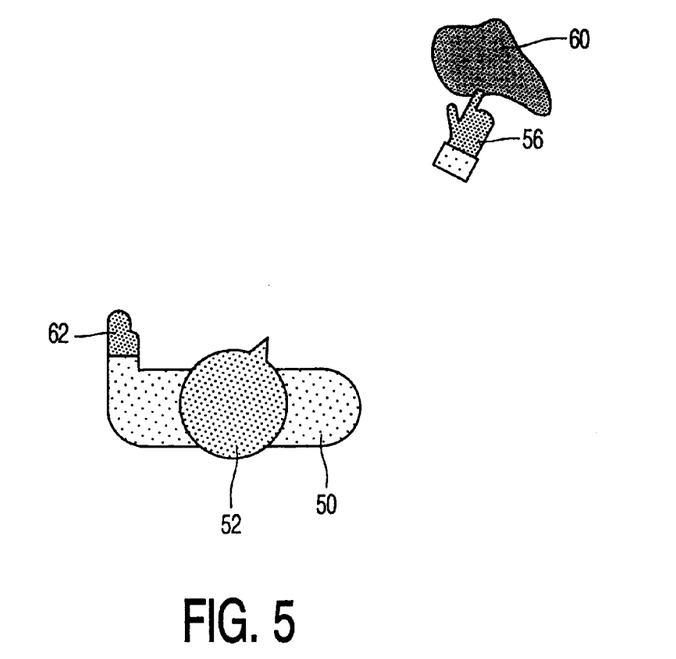
FIGS. 5 to 7 illustrate the sequence of motions for transfer of an icon from active to passive sections of a compound cursor.
Figure 6:
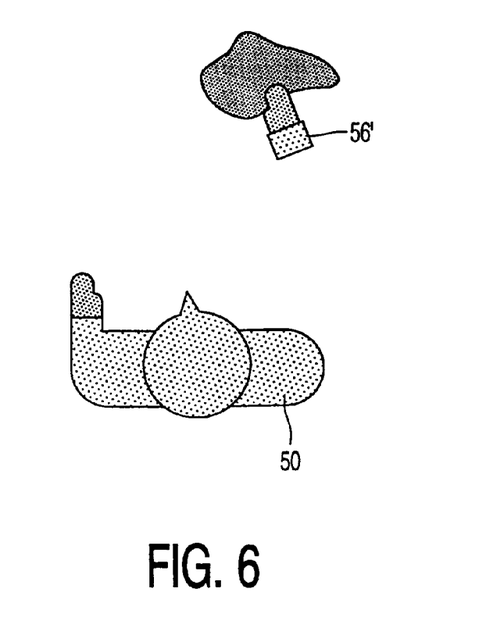
Figure 7:
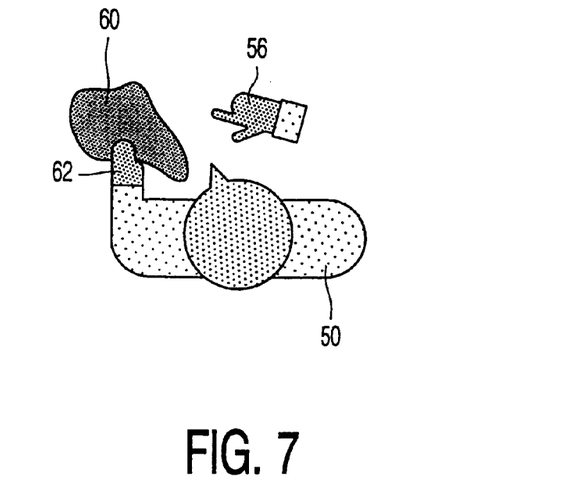

The anthropomorphic cursor of FIGS. 5 to 7 has two hands, one of which is the active cursor 56 controlled by the user with the mouse as before. The other hand 62 is a discrete part of the body 50 reserved to the passive cursor which can be used to hold objects that have been put on it by the active hand cursor 56. The user manipulates icons 60 from the virtual world of the GUI by first positioning the active hand 56 over the icon 60 as shown in FIG. 5. By pressing and releasing the left mouse button, the active hand 56 will "close" (i.e an alternative display form 56' for the active hand is called up from storage) and a scaled representation of the icon 60 appears attached to the hand 56' (as shown in FIG. 6). Dropping an object in the world, or on the passive hand 62 (as in FIG. 7) is done by positioning the active hand 56' and pressing the left mouse button again. Some objects, for example tools, can contain a certain functionality which it is preferred to activate with the right mouse button to avoid confusion with manipulation commands.

Users can move their anthropomorphic cursor around the GUI in a number of ways, for example by moving the active cursor in the desired direction and pressing and holding the middle mouse button (where provided). In effect, activation of the middle mouse button reduces the radius of the ring 42 (FIG. 1) to be less than the separation of M and P with the cursor then moving along the vector passing through these points. Where there is no middle button for the mouse, the threshold ring 42 may have a fixed radius as described previously, with the passive cursor portion trailing the active along vector P-M when the separation exceeds the threshold. Speed can be controlled by moving the active cursor further away from the passive (faster speed) or closer to the passive (slower speed). Some objects in the GUI (particularly when it takes the form of a virtual world with features like walls or locked doors) might prevent the cursor from moving, necessitating the user to navigate a path around these barriers.

An extension to the system is a multi-user arrangement where a number of users, perhaps at separate work stations linked to a central control by a data network, are presented with a common GUI representing a virtual world in which each user's anthropomorphic cursor appears. Preferably, with such an arrangement, each user is enabled to customise their cursor to at least a certain extent such that they can rapidly recognise it from amongst several which might appear on screen at the same time.

Figure 8:
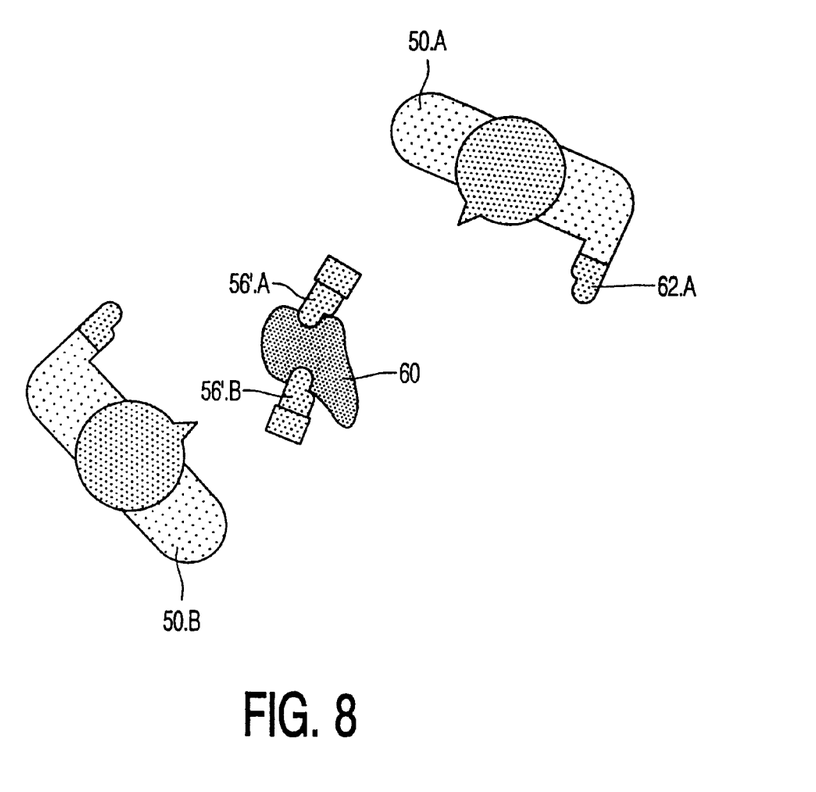
FIG. 8 illustrates transfer between respective active sections of two independently controlled compound cursors.

Each user has a respective input device such as a mouse or joystick by which they control their respective cursor to navigate the GUI. As shown in FIG. 8, with multiple users, the interaction is not limited to that between an anthropomorphic cursor and the GUI icons, there may also be interaction between two such anthropomorphic cursors controlled by separate (and perhaps physically separated users): in the Figure the active cursors 56'.A, 56'.B of respective anthropomorphic cursors have each selected a common object 60. This might occur as part of a dispute between two cursor operators as to the "ownership" of that particular icon, or it may represent co-operation between the two users, with one having picked up the icon 60 from a remote location within the GUI (as in FIGS. 5 and 6) and carried it to a point where the other anthropomorphic cursor is encountered at which point the first cursor holds the object steady whilst the second selects it. By then de-selecting the icon 60 the first anthropomorphic cursor leaves it in the grasp of the second anthropomorphic cursor. Alternatively, the handover of an icon may be carried out by the active cursor of one anthropomorphic cursor depositing it on the passive cursor of another, although this would require the passive cursor to be provided with a means for distinguishing between icons deposited and icons merely encountered as the cursor moves.

Figure 9:
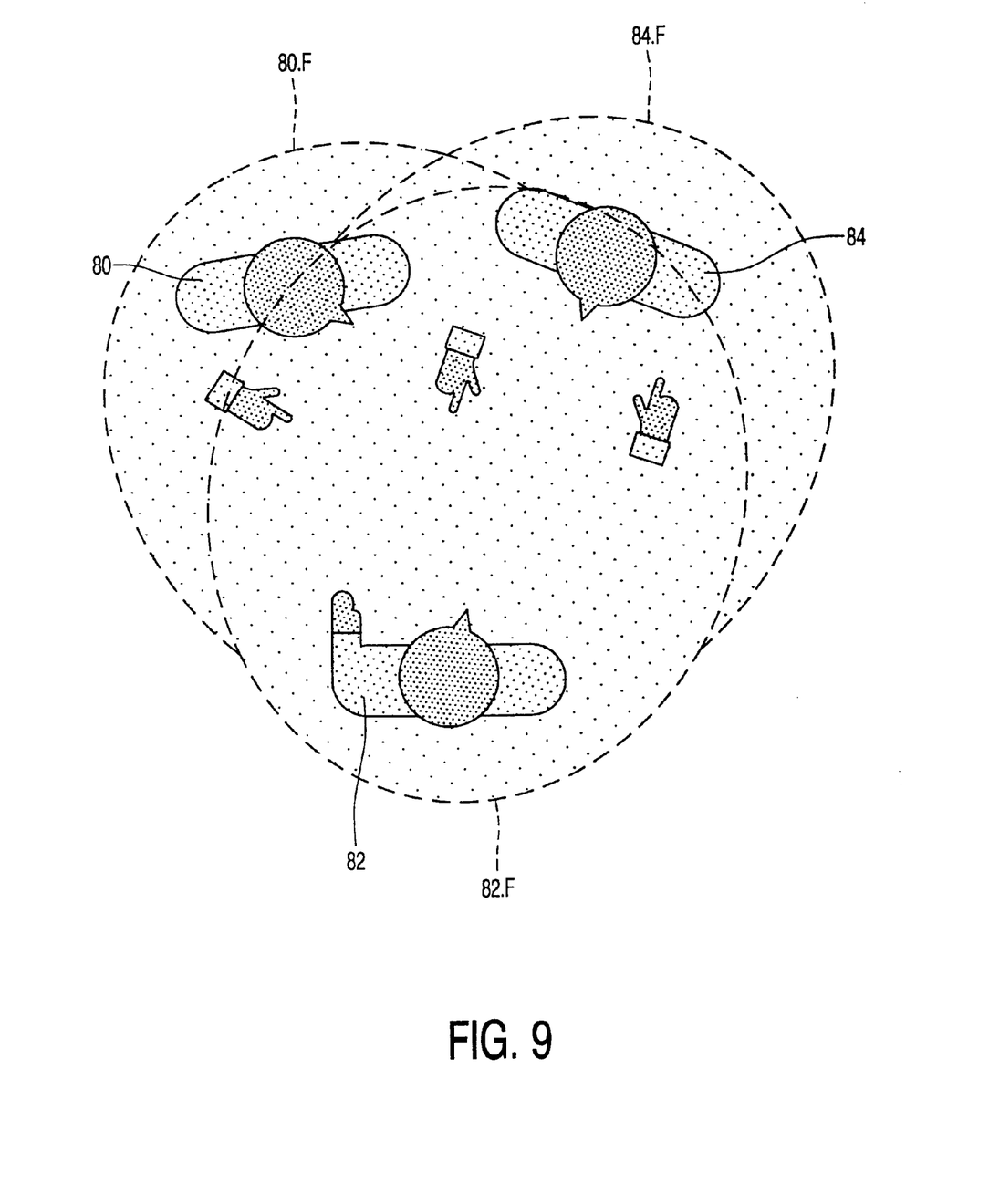
FIG. 9 represents an extension to the arrangement for multiple independently controlled compound cursors in an interactive environment.

A further interaction feature which may be provided in association with the anthropomorphic cursors is the use of audio auras or fields. This is illustrated in FIG. 9, which represents three anthropomorphic cursors generally indicated at 80, 82, and 84 with respective but overlapping audio fields 80F, 82F and 84F. If objects or other users enter a cursor's invisible audio field, the user is enabled to hear them and vice versa. The audio fields are shaped so that objects in front of the user (as represented by the anthropomorphic cursor) will sound louder than those behind him. If the active hand of the cursor is moved, the head will rotate to follow as described previously, and with any rotation of the head the audio field will also rotate.

Figure 10:
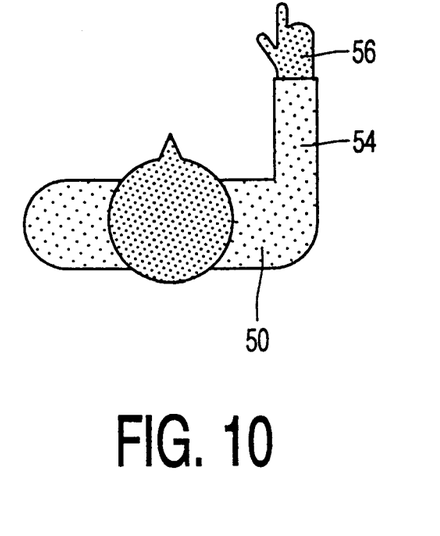
FIGS. 10 and 11 represent further alternative configurations of cursor embodying the invention.
Figure 11:
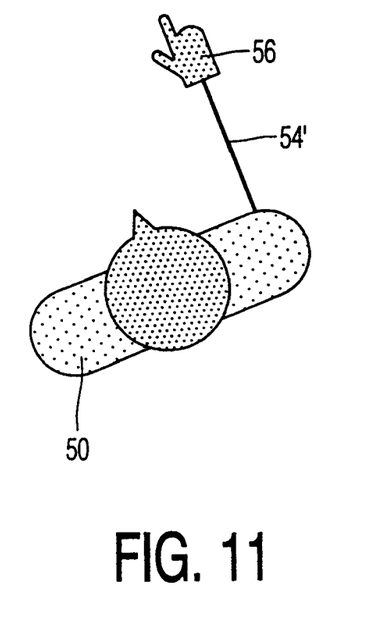

FIGS. 10 and 11 illustrate two further forms for the appearance of the anthropomorphic cursor. In FIG. 10, the active cursor (hand portion) 56 is linked directly to the body 50 by an arm 54 similar to that shown in FIG. 2 but extending the full length of the gap between M and S. In FIG. 11 the active hand portion 56 is linked to the body 50 (again pivoting about point S) by a single extensible line 54' generated by conventional rubber-banding technique to provide an apparently elastic link between the active hand and the trailing (passive) body.

To summarise, a compound cursor arrangement for use in the graphic user interface of a computer system is described. The compound cursor comprises an active part which acts in conventional manner and is manoeuvred directly by user commands from an input device such as a mouse or trackball. Accompanying the active portion is a passive cursor which follows the active cursor around the display when the separation between the two cursor parts exceeds a threshold value. The function of the passive cursor is to drag icons selected by the active cursor and deposited on the passive cursor, the active cursor then being freed for other tasks.

From reading the present disclosure, other modifications will be apparent to persons skilled in the art. Such modifications may involve other features which are already known in the field of user interface generation, control and display apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. Apparatus arranged to generate a graphic user interface (GUI) for presentation via a display device to a user, said apparatus supporting user-directed cursor manipulation of icons presented in the GUI and comprising:

data processing means coupled with one or more storage devices and configured to generate a GUI, representative of apparatus operations and comprising a plurality of icons, for output to a display device;

an input for user position signals coupled with said data processing means, said data processing means being arranged to generate a first cursor, an active cursor, within the GUI at a location determined by said user position signals; and an input for a user selection signal coupled with said data processing means, the active cursor acting to drag an overlaid icon, as directed by the user position signals, following receipt of a user selection signal;

characterised in that the data processing means is further arranged to generate a second cursor, a passive cursor, within the GUI, movement of the passive cursor being determined at least partly by that of the active cursor when the separation of the active and passive cursors exceeds a threshold value, and the passive cursor being arranged to drag an icon placed thereon by the active cursor.

2. Apparatus as claimed in claim 1, wherein the active cursor is displayed with a screen orientation determined by the relative locations within the GUI of the active and passive cursors.

3. Apparatus as claimed in claim 1, wherein the passive cursor is displayed with a screen orientation determined by the relative locations within the GUI of the active and passive cursors.

4. Apparatus as claimed claim 1, wherein the extent of movement of the active cursor within the GUI in relation to a given increment in user position signal is determined by the relative separation of the active and passive cursors.

5. Apparatus as claimed in claim 1, wherein the data processing means is arranged to select one of two or more display forms of the active cursor, in dependence on whether or not an icon has been selected.

6. Apparatus as claimed in claim 1, wherein the data processing means is arranged to generate two or more passive cursors accompanying an active cursor and operable to drag respective icons.

7. Apparatus as claimed in claim 1, being configured for multiple users, having respective user position signal and selection signal inputs and being arranged to generate a separate active cursor, with respective passive cursor, for each user.

8. Apparatus as claimed in claim 7, further comprising means for enabling each user to select a respective one from a plurality of stored active and associated passive cursor display forms.

9. Apparatus as claimed in claim 2, wherein the passive cursor is displayed with a screen orientation determined by the relative locations within the GUI of the active and passive cursors.

10. Apparatus as claimed claim 9, wherein the extent of movement of the active cursor within the GUI in relation to a given increment in user position signal is determined by the relative separation of the active and passive cursors.

* * * * *